(12) United States Patent
Bielak

(10) Patent No.: US 11,320,017 B2
(45) Date of Patent: May 3, 2022

(54) SHOCK ABSORBER ASSEMBLY

(71) Applicant: BeijingWest Industries Co., Ltd., Beijing (CN)

(72) Inventor: Roman Bielak, Cracow (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 27 days.

(21) Appl. No.: 16/819,007

(22) Filed: Mar. 13, 2020

(65) Prior Publication Data
US 2021/0207678 A1 Jul. 8, 2021

(30) Foreign Application Priority Data

Jan. 6, 2020 (CN) .......................... 202010009251.1

(51) Int. Cl.
*F16F 9/34* (2006.01)
*F16F 9/504* (2006.01)
(Continued)

(52) U.S. Cl.
CPC ................ *F16F 9/504* (2013.01); *F16F 9/18* (2013.01); *F16F 9/34* (2013.01); *F16F 9/49* (2013.01);
(Continued)

(58) Field of Classification Search
CPC ........ F16F 9/34; F16F 9/48; F16F 9/49; F16F 9/165; F16F 9/185; F16F 9/516; F16F 9/3465; B60G 13/08
(Continued)

(56) References Cited

U.S. PATENT DOCUMENTS 9,441,700 B2 9/2016 Nowaczyk et al.
2002/0053493 A1 5/2002 Sintorn et al.
(Continued)

FOREIGN PATENT DOCUMENTS

CN 101004199 A 7/2007
CN 202023876 U 11/2011
(Continued)

OTHER PUBLICATIONS

First Office Action and search report dated Feb. 3, 2021 for counterpart Chinese patent application No. 202010009251.1, along with machine EN translation downloaded from EPO.
(Continued)

*Primary Examiner* — Christopher P Schwartz
(74) *Attorney, Agent, or Firm* — William H. Honaker; Dickinson Wright PLLC

(57) ABSTRACT

A shock absorber assembly comprises a main tube disposed on a center axis between a first and a second end and defining a fluid chamber extending therebetween. A first piston is slidably disposed in the fluid chamber dividing the fluid chamber into a compression chamber and a rebound chamber. A piston rod attaches to the first piston for moving the first piston between a compression stroke and a rebound stroke. A hydraulic compression stop includes a second piston located in the compression chamber and attached to the piston rod. A tenon couples to the piston rod, located between the first piston and the second piston. The tenon includes a frequency dependent damping valve coupled to the first piston and an enclosure extending about the frequency dependent damping valve, coupled to the frequency dependent valve and the second piston, in fluid communication with the compression chamber.

9 Claims, 2 Drawing Sheets

(51) Int. Cl.
*F16F 9/18* (2006.01)
*F16F 9/49* (2006.01)
*F16F 9/58* (2006.01)
*B60G 13/08* (2006.01)
*B60G 17/08* (2006.01)
*F16F 9/54* (2006.01)

(52) U.S. Cl.
CPC ............. *F16F 9/585* (2013.01); *B60G 13/08* (2013.01); *B60G 17/08* (2013.01); *B60G 2202/24* (2013.01); *B60G 2204/128* (2013.01); *B60G 2206/41* (2013.01); *B60G 2500/11* (2013.01); *B60G 2800/162* (2013.01); *F16F 9/185* (2013.01); *F16F 9/54* (2013.01); *F16F 2222/12* (2013.01); *F16F 2228/04* (2013.01); *F16F 2228/066* (2013.01)

(58) Field of Classification Search
USPC ............................................. 188/315, 322.13
See application file for complete search history.

(56) References Cited

U.S. PATENT DOCUMENTS

| | | | | |
|---|---|---|---|---|
| 2014/0048365 A1* | 2/2014 | Kim | .......................... | F16F 9/34 188/322.13 |
| 2015/0330475 A1* | 11/2015 | Slusarczyk | ............... | F16F 9/49 188/288 |
| 2016/0223045 A1* | 8/2016 | Baldoni | ............... | B60G 15/062 |
| 2018/0119770 A1* | 5/2018 | Bruno | ..................... | F16F 9/516 |
| 2018/0355944 A1 | 12/2018 | Veltum et al. | | |
| 2019/0162266 A1* | 5/2019 | Flacht | ....................... | F16F 9/34 |

FOREIGN PATENT DOCUMENTS

| | | | |
|---|---|---|---|
| CN | 103423358 | A | 12/2013 |
| CN | 2034533373 | U | 2/2014 |
| CN | 106662193 | A | 5/2017 |
| CN | 106907421 | A | 6/2017 |
| CN | 206530637 | U | 9/2017 |
| CN | 107771255 | A | 3/2018 |
| CN | 108055861 | A | 5/2018 |
| CN | 108253073 | A | 7/2018 |
| CN | 108757811 | A | 11/2018 |
| CN | 109154352 | A | 1/2019 |
| CN | 109404472 | A | 3/2019 |
| CN | 109416103 | A | 3/2019 |
| DE | 102016208844 | A1 | 11/2017 |
| EP | 2404077 | A1 | 1/2012 |
| JP | 2012519813 | A | 8/2012 |
| JP | 2015263799 | A | 9/2015 |
| KR | 20180098726 | A | 9/2018 |
| KR | 20180098937 | A | 9/2018 |
| WO | 03040586 | A1 | 5/2003 |
| WO | 2020115642 | A1 | 8/2018 |

OTHER PUBLICATIONS

Extended European Search Report dated Jun. 18, 2021 for counterpart European patent application No. 21150484.0.

* cited by examiner

SHOCK ABSORBER ASSEMBLY

CROSS REFERENCE TO RELATED APPLICATION

The present application claims priority to Chinese Patent Application Ser. No. CN202010009251.1, filed on Jan. 6, 2020, the entire content of which is incorporated herein by reference.

TECHNICAL FIELD

The present invention generally relates to a shock absorber assembly.

BACKGROUND

There is an increased demand for improved comfort without deterioration of vehicle's handling performance. Hence, there is an opportunity to apply frequency dependent damping that reduces the rebound forces as the stroke frequency increases. On the other hand hydraulic compression stops are used to improve comfort throughout trim of spike loads transferred from suspension into the vehicle's body.

The frequency dependent damping and the hydraulic compression stop are considered separately and applied in separate systems. The frequency dependent damping is not designed to take high pressures in a compression stroke, hence its application as a piston of the hydraulic compression stop will greatly limit tuning range of additional damping developed by the hydraulic compression stop system.

It should be noted that the above description of the background is merely provided for clear and complete explanation of the present invention and for easy understanding by those skilled in the art. And it should not be understood that the above technical solution is known to those skilled in the art as it is described in the background of the present invention.

SUMMARY OF INVENTION

The present invention provides a shock absorber assembly that combines a hydraulic compression stop with a frequency dependent damping valve. The shock absorber assembly protects the frequency dependent damping valve from high pressures in the hydraulic compression stop, thereby avoiding limiting a tuning range of additional damping developed by the hydraulic compression stop and superimposing both performance benefits of the hydraulic compression stop and the frequency dependent damping.

It is one aspect of the present invention to provide a shock absorber assembly. The shock absorber assembly comprises a main tube disposed on a center axis and extending between a first end and a second end. The main tube defines a fluid chamber extending between the first end and the second end for containing a working fluid. A first piston is slidably disposed in the fluid chamber dividing the fluid chamber into a compression chamber and a rebound chamber. The compression chamber extends between the first piston and the first end. The rebound chamber extends between the first piston and the second end. A piston rod is disposed on the center axis and attached to the first piston for moving the first piston between a compression stroke and a rebound stroke. A hydraulic compression stop including a second piston is located in the compression chamber and attached to the piston rod. The second piston is axially spaced apart from the first piston for movement with the piston rod during the compression stroke and the rebound stroke to provide additional damping force. A tenon couples to the piston rod and located between the first piston and the second piston. The tenon includes a frequency dependent damping valve and an enclosure. The frequency dependent damping valve couples to the first piston. The enclosure extends about the frequency dependent damping valve and couples to the frequency dependent damping valve and the second piston and in fluid communication with the compression chamber.

According to an embodiment of the present invention, the frequency dependent damping valve can include a solid part and a hollow part, the solid part being coupled to the second piston and the hollow part joining the frequency dependent damping valve with the solid part.

According to an embodiment of the present invention, the frequency dependent damping valve can define an accumulator chamber, the accumulator being in communication with the hollow part allows for free flow of the working fluid between the accumulator chamber and the compression chamber.

According to an embodiment of the present invention, the dependent damping valve can define at least one orifice to allow fluid communication between the accumulator chamber and the compression chamber.

According to an embodiment of the present invention, the hollow part can include a body portion coupled to the solid part and the frequency dependent damping valve, the body portion extending about the center axis and between the solid part and the frequency dependent damping valve.

According to an embodiment of the present invention, the body portion can define at least one hole in fluid communication with the compression chamber.

According to an embodiment of the present invention, the body portion can define at least one aperture, circumferentially spaced from said at least one hole, in fluid communication with the compression chamber.

According to an embodiment of the present invention, the hydraulic compression stop can include an insert, located in the compression chamber, coupled to the first end for receiving the second piston during the compression stroke.

According to an embodiment of the present invention, the shock absorber assembly can further include a sealing ring extending about the second piston for engaging the insert during the compression stroke.

According to an embodiment of the present invention, the solid part can define a groove, located in said compression chamber, extending about said center axis for receiving said sealing ring.

According to an embodiment of the present invention, the solid part can define a bore, extending along said center axis toward said piston rod, for receiving said second piston.

An advantage of the embodiments of the present invention exists in that limiting a tuning range of additional damping developed by the hydraulic compression stop is avoided and both performance benefits of the hydraulic compression stop and the frequency dependent damping are superimposed.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present invention, which constitute a part of the specification and illustrate the preferred embodiment of the present invention, and are used for setting forth the principles of the present invention together with the description. It is obvious that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

These and further aspects and features of the present invention will be apparent with reference to the following description and attached drawings. In the description and drawings, particular embodiments of the present invention have been disclosed in detail as being indicative of some of the ways in which the principles of the present invention may be employed, but it is understood that the present invention is not limited correspondingly in scope. Rather, the present invention includes all changes, modifications and equivalents coming within the terms of the appended claims.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Furthermore, in the following description of this disclosure, for the sake of convenience of explanation, a direction of radius taking a central axis A of a bore of a cylinder body as a center is referred to as "a radial direction", a direction of a circumference taking the central axis as a center is referred to as "a circumferential direction", a direction along a direction of the central axis is referred to as "an axial direction".

Figure 1:
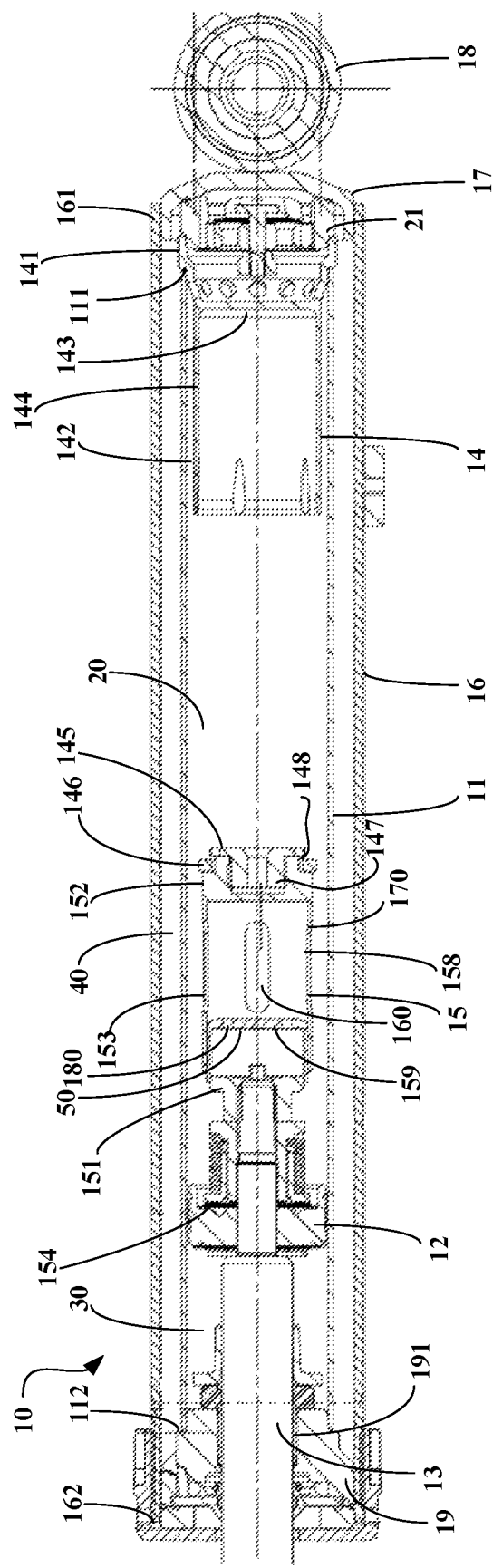
FIG. 1 is an axial cross-sectional view of a shock absorber assembly constructed in accordance with an embodiment of the present invention.
Figure 2:
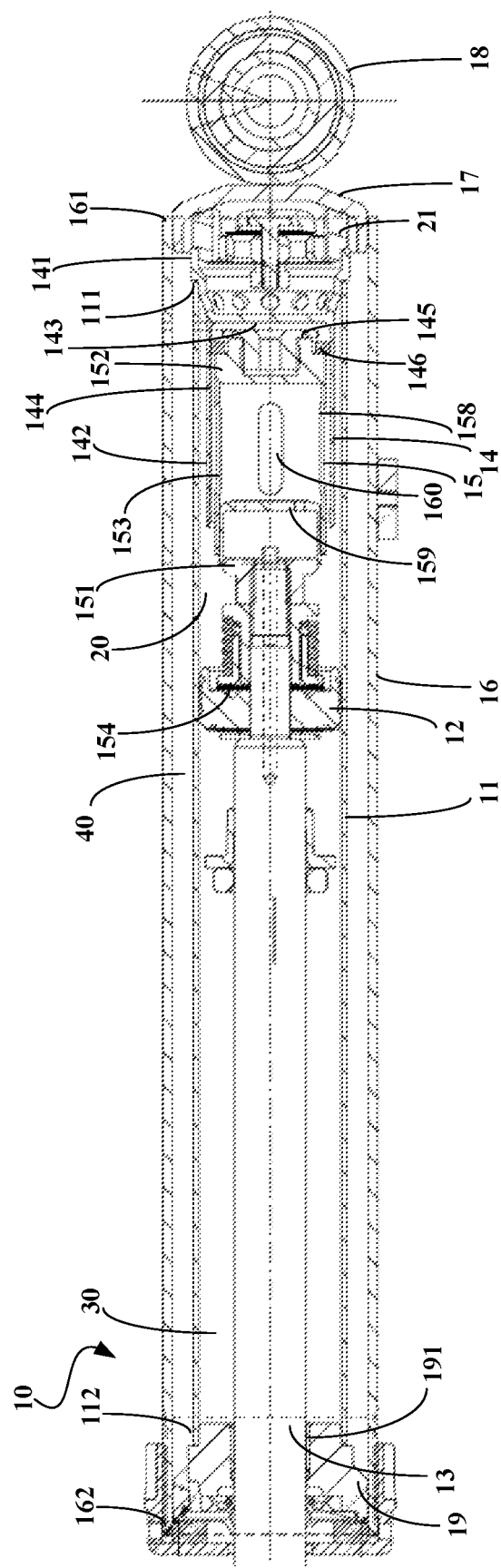
FIG. 2 is an axial cross-sectional view of the shock absorber assembly in a compression stroke when a hydraulic compression stop engage a second piston.

Referring to the Figures, wherein like numerals indicate corresponding parts throughout the several views, a shock absorber assembly 10 for use in a vehicle constructed in accordance with one embodiment of the present invention is generally shown in FIGS. 1 and 2. As shown in FIGS. 1 and 2, the shock absorber assembly 10 comprises a main tube 11, a first piston 12, a piston rod 13, a hydraulic compression stop 14 and a tenon 15.

The main tube 11, having a generally cylindrical shape, is disposed on a center axis A and extends annularly about the center axis A between a first end 111 and a second end 112. The main tube 11 defines a fluid chamber 20, 30 extending between the first end 111 and the second end 112 for containing a working fluid.

An external tube 16, having a generally cylindrical shape, is disposed on the center axis A and radially spaced from the main tube 11. The external tube 16 extends annularly about the center axis A between a closed end 161 and an open end 162. The closed end 161 is located adjacent to and radially spaced from the first end 111 of the main tube 11. The open end 162 is located adjacent to and radially spaced from the second end 112 of the main tube 11 thereby defining a compensation chamber 40 extending about the center axis A between the main tube 11 and the external tube 16.

A cap 17 is disposed at the closed end 161 of the external tube 16 to close the fluid chamber 20, 30 and the compensation chamber 40. It should be appreciated that the main tube 11 and the external tube 16 may have a shape other than cylindrical. In addition, it should be appreciated that a mounting ring 18, having a generally circular shape, can be disposed on the cap 17 for attaching the shock absorber assembly 20 to the vehicle.

The first piston 12, having a generally cylindrical shape, is slidably disposed in the fluid chamber 20, 30. The first piston 12 divides the fluid chamber 20, 30 into a compression chamber 20 and a rebound chamber 30. The compression chamber 20 extends between the first piston 12 and the first end 111 of the main tube 11. The rebound chamber 30 extends between the first piston 12 and the second end 112 of the main tube 11.

A piston rod guide 19 is disposed in the rebound chamber 30, adjacent to the second end 112 of the main tube 11 and the open end 162 of the external tube 16, and in sealing engagement with the main tube 11 and the external tube 16 to close the rebound chamber 30 and the compensation chamber 20. The piston rod guide 19 defines a bore 191, having a generally cylindrical shape, extending along the center axis A and in fluid communication with the rebound chamber 30.

The piston rod 13, having a generally cylindrical shape, is disposed on the center axis A and extends along the center axis A, through the bore 191 of the piston rod guide 19, into the rebound chamber 30 and coupled to the first piston 12 for moving the first piston 12 between a compression stroke and a rebound stroke. During the compression stroke, the piston rod 13 and the first piston 12 moves toward the first end 111 of the main tube 11 and the closed end 161 of the external tube 16. During the rebound stroke, the piston rod 13 and the first piston 12 moves toward the second end 112 of the main tube 11 and the piston rod guide 19.

The hydraulic compression stop 14 is located in the compression chamber 20 and coupled to the first end 111 of the main tube 11 for providing an additional damping force during the compression stroke. The hydraulic compression stop 14 includes a fixed member 141, having a generally cylindrical shape, attached to the first end 111 of the main tube 11.

The hydraulic compression stop 14 further includes an insert 142, having a generally cylindrical shape, disposed on the center axis A in the compression chamber 20. The insert 142 includes a bottom 143, having a circular shape, and a wall 144, having a generally tubular shape. The bottom 143 of the insert 142 is located in compression chamber 20 and attached to the fixed member 141. The wall 144 of the insert 142, located in the compression chamber 20 and radially spaced from the main tube 11, extends annularly outwardly from the bottom 143.

The hydraulic compression stop 14 further includes a second piston 145 disposed in the compression chamber 20 and coupled to the piston rod 13 for movement with the piston rod 13 during the compression stroke and the rebound stroke to provide the additional damping force by engaging the insert 142 during the compression stroke. As shown in FIG. 2, the second piston 145 includes a sealing ring 146 engaging the wall 144 of the insert 142 during the compression stroke.

A base valve 21, located in the compression chamber 20 and adjacent to the closed end 161 of the external tube 16, couples to the fixed member 141 for regulating fluid flow between the compression chamber 20 and the compensation chamber 40.

The tenon 15 couples to the piston rod 13 and located between the first piston 12 and the second piston 145. The tenon 15 includes a frequency dependent damping valve 151 and an enclosure 152, 153. The frequency dependent damping valve 151 couples to the first piston 12. The enclosure 152, 153 extends about the frequency dependent damping valve 151. The enclosure 152, 153 couples to the frequency dependent damping valve 151 and the second piston 145 and in fluid communication with the compression chamber 20. The frequency dependent damping valve 151 includes a solid part 152 and a hollow part 153. The solid part 152 couples to the second piston 145. The hollow part 153 joins the frequency dependent damping valve 151 with the solid part 152. It should be appreciated that the solid part 152 is provided for protecting the frequency dependent damping valve 151 from high pressures. Accordingly, the solid part 152 is monolithic and can be made from materials having high tensile strength such as steel. The solid part 152 defines a groove 148, located the compression chamber 20, extending about the center axis A for receiving the sealing ring 146. The solid part 152 further defines a bore 147 extending along the center axis A toward the piston rod 13 for receiving the second piston 145.

The frequency dependent damping valve 151 defines an accumulator chamber 50 located adjacent to the hollow part 153 and extending along the center axis A. The accumulator chamber 50 is in communication with the hollow part 153 and the compression chamber 20 thereby allows for free flow of the working fluid between the accumulator chamber 50 and the compression chamber 20. According to an embodiment of the present invention, the dependent damping valve 151, e.g. a surface 159 of the dependent damping valve 151, defines at least one orifice 180 to allow fluid communication between the accumulator chamber 50 and the compression chamber 20.

When the frequency of the movement of the shock absorber assembly 10 is low, only a first fluid channel is open during the rebound stroke, and the work fluid flows through a piston valve 154 and the first fluid channel from the rebound chamber 30 to the compression chamber 20. When the frequency of the shaking of the shock absorber assembly is high, the frequency dependent valve 151 controls a second fluid channel, thereby both the first fluid channel and the second fluid channel are open during the rebound stroke.

The hollow part 153 includes a body portion 158 coupled to the solid part 152. The body portion 158 is also coupled to the frequency dependent damping valve 151, the body part 158 extends from the solid part 152 to the frequency dependent damping valve 151 on the center axis A.

The hollow part 153 defines at least one hole 160 located on the body portion 158 and in communication with the compression chamber 20 for allowing free flow of the working fluid between the accumulator chamber 50 and the compression chamber 20 thereby to reduce pressure inside the accumulator chamber 50. It should be appreciated that the at least one hole 160 can have any shape and is not limited in the present invention, e.g. an elliptical shape or a circular shape. The body portion 158 defines at least one aperture 170, circumferentially spaced from the at least one hole 160, in fluid communication with the compression chamber 20 for allowing the working fluid to flow from the compression chamber 20 and pass through the body portion 158.

In operation, during the compression stroke, the first piston 12 and the second piston 145 move toward the first end 111 of the main tube 11. In response to the movement of the piston rod 13, the first piston 12, and the second piston 145, the working fluid flows from the compression chamber 20 to the rebound chamber 30 or the compensation chamber 40. In addition, during the compression stroke, the sealing ring 146 of the second piston 145 slidably engages the wall 144 of the insert 142 thereby providing the additional damping force.

During the rebound stroke, the first piston 12 and the second piston 145 move toward the second end 112 of the main tube 11. In response to the movement of the piston rod 13, the first piston 12, and the second piston 145, the working fluid flows from the rebound chamber 30 or the compensation chamber 40 to the compression chamber 20. When the frequency of the movement of the shock absorber assembly 10 is high, the working fluid flows through both the first fluid channel and the second fluid channel of the frequency dependent damping valve 151. In addition, during the rebound stroke, the working fluid flows in and out the accumulator chamber 50 through the hollow part 153 to the compression chamber 20.

Thereby the frequency dependent damping valve 151 is protected from high pressures and both performance benefits of the hydraulic compression stop and the frequency dependent damping are superimposed.

The present invention is described above with reference to particular embodiments. However, it should be understood by those skilled in the art that such a description is illustrative only, and not intended to limit the protection scope of the present invention. Various variants and modifications may be made by those skilled in the art according to the principle of the present invention, and such variants and modifications fall within the scope of the present invention.

What is claimed is:

1. A shock absorber assembly comprising:
  a main tube disposed on a center axis and extending between a first end and a second end defining a fluid chamber extending therebetween for containing a working fluid;
  a first piston slidably disposed in said fluid chamber dividing said fluid chamber into a compression chamber and a rebound chamber, said compression chamber extending between said first piston and said first end and said rebound chamber extending between said first piston and said second end;

a piston rod disposed on said center axis and attached to said first piston for moving said first piston between a compression stroke and a rebound stroke;

a hydraulic compression stop including a second piston located in said compression chamber and attached to said piston rod, said second piston being axially spaced apart from said first piston, for movement with said piston rod during said compression stroke and said rebound stroke to provide additional damping force; and a tenon coupled to said piston rod and located between said first piston and said second piston, said tenon including a frequency dependent damping valve coupled to said first piston and an enclosure extending about said frequency dependent damping valve, said enclosure being coupled to said frequency dependent damping valve and said second piston and in fluid communication with said compression chamber, wherein said enclosure includes a solid part and a hollow part, said solid part being coupled to said second piston and said hollow part joining said frequency dependent damping valve with said solid part, said frequency dependent damping valve defines an accumulator chamber, said accumulator chamber being in communication with said hollow part allows for free flow of said working fluid between said accumulator chamber and said compression chamber.

2. The shock absorber assembly according to claim 1, wherein said hollow part includes a body portion coupled to said solid part and said frequency dependent damping valve, said body portion extending about said center axis and between said solid part and said frequency dependent damping valve.

3. The shock absorber assembly according to claim 2, wherein said body portion defines at least one hole in fluid communication with said compression chamber.

4. The shock absorber assembly according to claim 3, wherein said body portion defines at least one aperture, circumferentially spaced from said at least one hole, in fluid communication with said compression chamber.

5. The shock absorber assembly according to claim 1, wherein said hydraulic compression stop includes an insert, located in said compression chamber, coupled to said first end for receiving said second piston during said compression stroke.

6. The shock absorber assembly according to claim 5 further including a sealing ring extending about said second piston for engaging said insert during said compression stroke.

7. The shock absorber assembly according to claim 6, wherein said solid part defines a groove, located in said compression chamber, extending about said center axis for receiving said sealing ring.

8. The shock absorber assembly according to claim 1, wherein said frequency dependent damping valve defines at least one orifice to allow fluid communication between said accumulator chamber and said compression chamber.

9. The shock absorber assembly according to claim 1, wherein said solid part defines a bore, extending along said center axis toward said piston rod, for receiving said second piston.

* * * * *